May 22, 1962　　　L. A. McCARTY ETAL　　　3,035,721
LOAD LIFTING STRUCTURE
Filed Aug. 26, 1959　　　　　　　　　　　　2 Sheets-Sheet 1
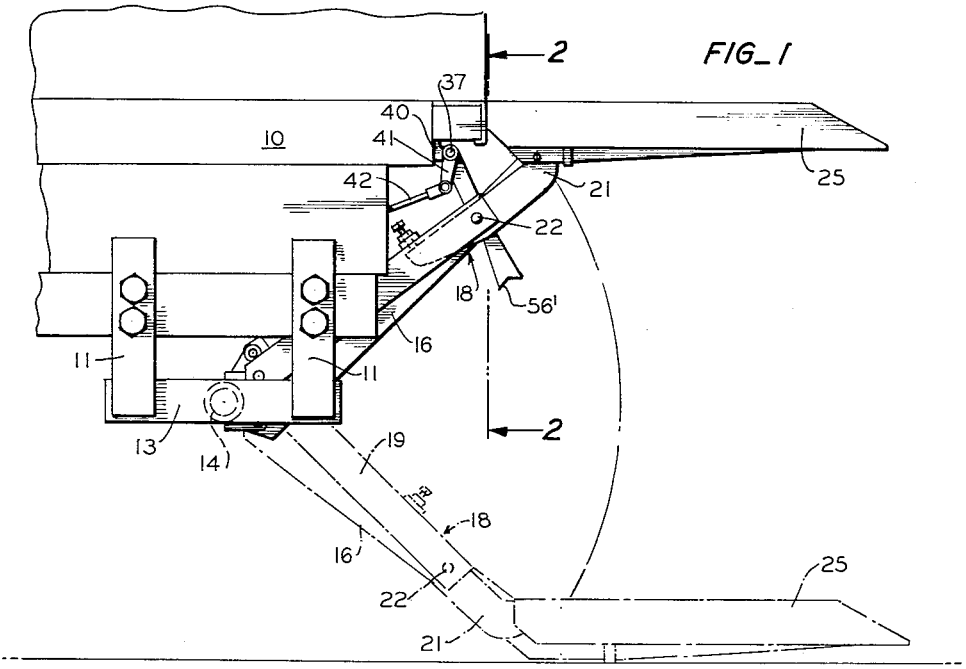
FIG_1
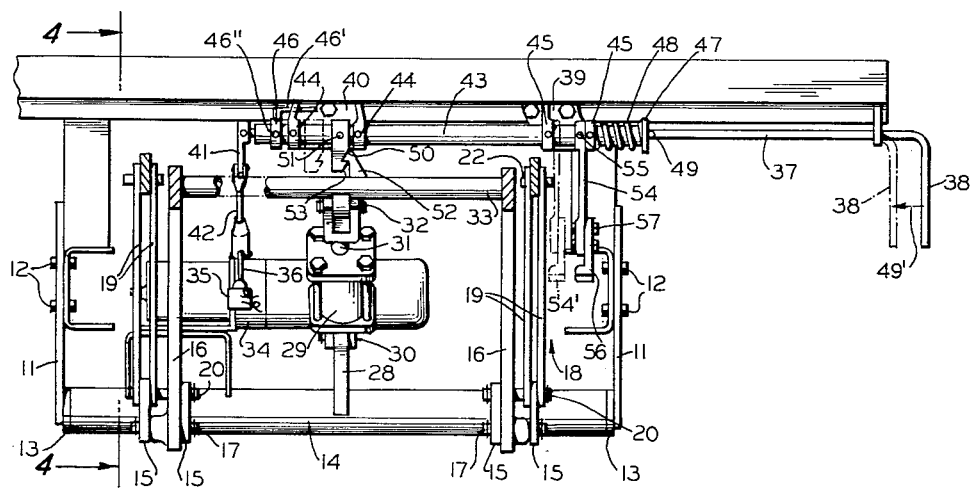
FIG_2
INVENTORS
LEE A. McCARTY
ANGELO S. ROSSONI
BY Naylor & Neal
ATTORNEYS May 22, 1962  L. A. McCARTY ETAL  3,035,721
LOAD LIFTING STRUCTURE
Filed Aug. 26, 1959  2 Sheets-Sheet 2
FIG_3
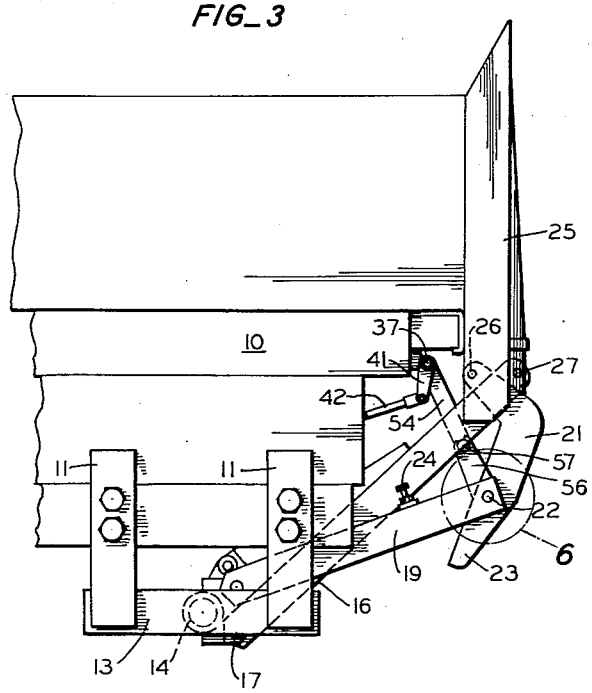
FIG_4
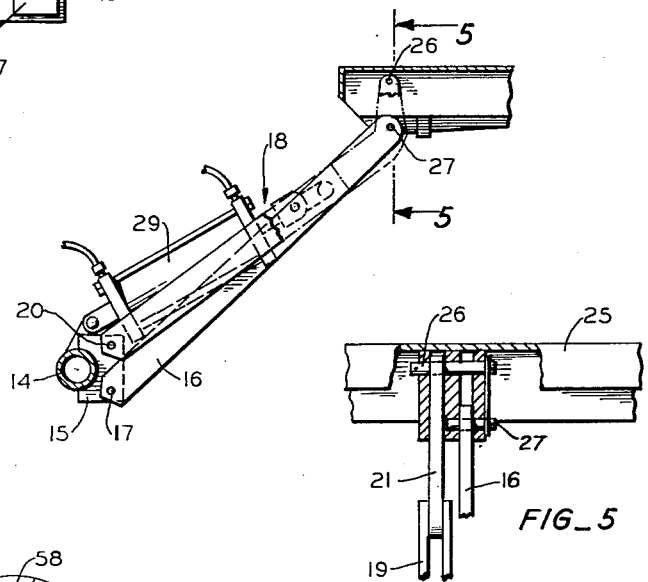
FIG_5
FIG_6
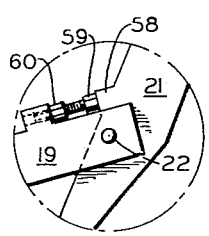
INVENTORS
LEE A. McCARTY
ANGELO S. ROSSONI
BY *Naylor + Neal*
ATTORNEYS United States Patent Office 3,035,721
Patented May 22, 1962

3,035,721
LOAD LIFTING STRUCTURE
Lee A. McCarty, Pleasant Hill, and Angelo S. Rossoni, San Francisco, Calif., assignors to H. S. Watson Company, Emeryville, Calif., a corporation of California
Filed Aug. 26, 1959, Ser. No. 836,248
6 Claims. (Cl. 214—77)

This invention relates as indicated to an improved load lifting structure and more particularly to such a structure particularly adapted to use as a lift tail gate on motor vehicles.

Lift tail gates for motor vehicles are now in great demand because of the ease with which they may be employed to lift loads from the ground level to the level of the load carrying bed of the vehicle. The lift tail gates generally include a horizontal load supporting platform and means for mounting the platform on the vehicle and maintaining the platform in a horizontal position as the platform is swung from the ground level to the level of the vehicle bed. A particular type of such lift tail gate is in use in the art in which a generally horizontal platform may be rotated to a vertical position in which it does not unduly extend the overall length of the vehicle and in which it serves a very useful function of closing the rear opening in the load carrying compartment of the vehicle. One lift tail gate of this latter type is disclosed in U.S. Patent No. 2,822,938 to Ormsby; this type of lift tail gate provides for rotation of the load carrying platform from a horizontal to a vertical position by folding a tension arm in the platform supporting means.

The particular lift tail gate disclosed in said aforementioned patent is particularly useful since it provides means for rotating the load carrying platform from a horizontal to a vertical position by simple mechanical means which are not subject to excessive wear; the Ormsby patent does not require the use of a hydraulic cylinder in either the tension or compression arm in the platform supporting means in order to swing the platform from a horizontal to a vertical position. Though there are many useful features of the Ormsby structure, that structure is lacking in a number of practical respects since with that structure it is necessary to rotate the load carrying platform from the horizontal to vertical position manually and since that structure does not provide convenient means for latching the load carrying platform in a horizontal or a vertical elevated position.

Accordingly it is the principal object of this invention to provide an improved load lifting structure of the type disclosed in the Ormsby patent and in which the load supporting platform may be automatically rotated from a horizontal to a vertical position responsive to upward movement of the platform caused by conventional platform lifting mechanism.

It is another object of this invention to provide such an improved lift tail gate in which the load supporting platform may be automatically and rigidly latched in a raised position adjacent to the load carrying bed of the vehicle.

It is another object of this invention to provide such an improved lift tail gate in which the automatic latching of the platform in its elevated position can be accomplished with the platform either horizontally disposed or vertically disposed.

It is another object of this invention to provide efficient control means for raising and lowering the load carrying platform, latching and unlatching the platform in an elevated position, and selectively causing the platform to rotate from a horizontal to a vertical position, all of said operations being coupled efficiently to a single manually operable control handle.

Other objects and advantages of the invention will become apparent from the following description read in conjunction with the attached drawings, in which:

FIGURE 1 is a side elevational view of the rear portion of a motor vehicle equipped with the improved lift tail gate of this invention and in which the tail gate is illustrated by solid lines in its raised position and by broken lines in its lowered position;

FIGURE 2 is a rear elevational view, partially in cross section, of the apparatus of FIGURE 1 taken along the plane and in the direction indicated by the line and the arrows at 2—2 in FIGURE 1;

FIGURE 3 is a side elevational view similar to FIGURE 1 but illustrating the load supporting platform rotated to a vertical position closing the rear opening of the vehicle;

FIGURE 4 is a cross sectional view of the apparatus of FIGURE 2 taken along the plane and in the direction indicated by the line and the arrows at 4—4 in FIGURE 2;

FIGURE 5 is a cross sectional view of the apparatus of FIGURE 4 taken along the plane and in the direction indicated by the line and the arrows at 5—5 in FIGURE 4; and FIGURE 6 is a side elevational view of a fragment of the apparatus illustrated in FIGURE 3, said fragment being bounded by the circle 6 in FIGURE 3.

Broadly stated this invention comprises a load lifting structure including a frame, a normally horizontal load carrying platform, supporting means for connecting said platform to said frame for swinging movement with respect to said frame, and power means for swinging said platform and said supporting means from a lower position to an upper position with respect to said frame, said supporting means comprising a compression arm and a tension arm each pivotally connected to said frame and said platform, said tension arm being normally parallel to and equal in length to said compression arm thereby normally maintaining the platform horizontal as said platform swings from its lower position to its upper position, said tension arm being foldable on itself about a central pivot point thereby pivoting said platform about said compression arm from a horizontal position to a vertical position, the improvement comprising the provision of a closing brace associated with said supporting means positioned to restrict the approach of a point on said tension arm toward said frame as said supporting means swing from its lower position to its upper position, thereby pivoting said platform from said horizontal position to said vertical position responsive to the swinging movement of said supporting means from its lower position to its upper position.

Referring now in detail to the drawings and in particular to FIGURE 1, the rear portion of the frame of a motor vehicle is illustrated generally at 10 the frame having conventional connecting parts thereof which vary from vehicle to vehicle, the details of which form no part of this invention. Two vertical support plates 11 are rigidly secured to each side of frame 10 by means of bolts 12. The bottom portions of plates 11 are welded to horizontal rigid struts 13 which are in turn welded to the end of a trunnion 14. The trunnion 14 carries a pair of transversely spaced brackets 15 adjacent each side of trunnion 14 and a compression arm 16 is pivotally connected between each pair of brackets 15 by means of bolt 17. Pivotally connected to the outer bracket of each pair of brackets 15 is a tension arm generally indicated by arrow 18.

Each tension arm 18 comprises two laterally spaced struts 19 pivoted to bracket 15 by means of pivot pin 20. Struts 19 terminate intermediate of the ends of tension arm 18, and the remainder of tension arm 18 is made up of a strut 21 pivotally connected between struts 19 by means of central pivot pin 22. Strut 21 is shaped in the form of a rocker arm with pivot point 22 located intermediate of its end; strut 21 having an extension portion 23 which extends between struts 19 of the tension arm and contacts adjustable stop screw 24 for leveling the load carrying platform as described by the Ormsby patent. The outer end of tension arm 18 is pivotally connected to a load carrying platform 25 about pivot pin 26 and the outer end of compression arm 16 is pivotally connected to platform 25 about pivot pin 27. When platform 25 is in its normal load supporting position, the effective length of tension arm 18 as illustrated in FIGURE 4 is equal to the effective length of compression arm 16 and the two arms are parallel; that is, in the normal working position of platform 25 pivot pins 17, 20, 26 and 27 as illustrated in FIGURE 4 form a parallelogram. An ear 28 is rigidly mounted on trunnion 14 and a hydraulic cylinder 29 illustrated in FIGURE 2 is pivotally connected to ear 28 by means of pivot pin 30. A piston connecting rod 31 emanating from cylinder 29 is pivotally connected by means of pivot pin 32 to a cross bar 33 extending between the compression arms 16 on opposite sides of the platform supporting structure. Fluid under pressure is supplied to cylinder 29 from a fluid pump 34 which is actuated by an electric switch 35. Switch 35 is opened and closed by means of a switch handle 36. A manual control rod 37 having a handle 38 thereon is mounted transversely of vehicle frame 10 by means of guide brackets 39 and 40. Control rod 37 carries on its remote end a lever 41 which is connected to switch handle 36 by means of a link 42 whereby rotation of handle 38 to rotate control rod 37 about its axis actuates hydraulic motor switch 35. Hydraulic motor switch 35 is a conventional hydraulic motor switch having three control operations: first, it may actuate the motor to pump fluid into cylinder 29; second, it may close the valves in hydraulic motor 34 to prevent fluid flow to or from cylinder 29, and third, it may open valves in hydraulic motor 34 permitting venting of all fluid in cylinder 29.

A tubular support member 43 is mounted on control rod 37 coaxial therewith and supported in circular loops 44 and 45 on brackets 40 and 39, respectively. Member 43 has a clamp 46 mounted thereon having a pin 46′ slidably extending through bracket 40 to restrict rotational motion of member 43. Clamp 46 is adjustably mounted on member 43 by means of set screw 46″ which permits adjustment of the angular relationship of member 43 to bracket 40. Member 43 carries a flange 47 on the opposite end thereof limiting motion of member 43 in brackets 39 and 40 in the direction to the left as illustrated in FIGURE 2. A helical spring 48 is provided on member 43 coaxial therewith and bearing at its opposite end against flange 47 and the adjacent loop 45 on bracket 39 thus spring biasing tubular member 43 to the right as illustrated in FIGURE 2. Control rod 37 carries a pin 49 therethrough which engages flange 47 on member 43 moving member 43 to the left as illustrated in FIGURE 2 when handle 38 is moved to the left as indicated by arrow 49′ in FIGURE 2. A latch member 50 is rigidly mounted on support member 43 intermediate of the loops 44 on bracket 40. Latch member 50 is secured to member 43 by means of set screw 51. A mating latch member 52 is mounted on cross bar 33 of the platform supporting means positioned to engage latch member 51 and support the platform in its elevated position illustrated in FIGURE 1. Latch members 50 and 52 are provided with inclined surfaces 53 thereon to permit latch member 50 to be deflected to the left in FIGURE 2 prior to engagement of the latches as latch 52 on the platform supporting means is raised to the elevated position; such deflection of latch member 50 is accompanied by compression of spring 48, and spring 48 returns latch member 50 to a position of engagement with latch 52 (as illustrated by solid lines in FIGURE 2) as soon as latch member 52 has reached the top of its vertical path.

A closing brace 54 is mounted on member 43 intermediate of rings 45 on bracket 39 and is secured to member 43 by means of a set screw 55. The lower end of brace 54 comprises a strut member 56 adjustably attached to the remaining portion of brace 54 by means of bolts 57 extending through an elongated slot in member 56 and having a concave surface 56′ on the bottom thereof. Brace 54 is adjusted to such a length that in the closed position of the gate illustrated in FIGURE 3, a slight clearance will be present between surface 56′ and pin 22. In the normal position of brace 54 (illustrated by solid lines in FIGURE 2) where it is spring biased to the right, brace 54 does not engage any working parts of the platform supporting means. However, when control handle 38 is moved to the left to position 38′ compressing spring 48 and moving brace 54 to the left to position 54′ (illustrated by broken lines in FIGURE 2), the concave surface 56′ on brace 54 contacts pivot pin 22 in the center of tension arm 18 as tension arm 18 is raised from the lower position to the upper position of FIGURE 1 by the introduction of hydraulic fluid into cylinder 29. As soon as surface 56′ contacts pivot pin 22 it prevents further movement of pivot pin 22 toward the frame of the vehicle and accordingly further movement toward the vehicle of compression arm 16 as more fluid is introduced into cylinder 29 causes strut 21 of tension arm 18 to rotate about pivot pin 22 and accordingly causes platform 25 to rotate about pivot pin 27 from the horizontal position illustrated in FIGURE 1 to the vertical position illustrated in FIGURE 3. When the platform has rotated to a point where its center of gravity lies between pivot pin 27 and the frame of the vehicle, platform 25 will fall towards the frame of the vehicle thus producing clearance between surface 56′ and pin 22. Such clearance between surface 56′ and pin 22 permits brace 54, control rod 37, and latch member 50 to move to the right as illustrated in FIGURE 2 and accordingly to again function in the normal latching manner described above.

As illustrated in FIGURE 6, a boss 58 is provided on strut 21 with a surface 59 which is at right angles to the axis of strut 19 when platform 25 is in its vertical position. An adjustable stop screw 60 is mounted on strut 19. Adjustable stop 60 is adjusted to a position where it contacts surface 59 on boss 58 to prevent platform 25 from rotating about pivot pin 27 to a position left of the vertical as illustrated in FIGURE 3.

What is claimed is:

1. In a load lifting structure including a frame, a normally horizontal load carrying platform, supporting means for connecting said platform to said frame for swinging movement with respect to said frame, and power means for swinging said platform and said supporting means from a lower position to an upper position with respect to said frame, said supporting means comprising a compression arm and a tension arm each pivotally connected directly to said frame and to said platform, said tension arm being normally parallel to and equal in length to said compression arm to thereby normally maintain said platform horizontal as said platform swings from its lower position to its upper position, said tension arm being foldable on itself about a central pivot point to thereby enable the pivoting of said platform about said compression arm from a horizontal position to a vertical position, the improvement comprising a closing brace, means connecting said brace to said frame for selective movement between a first position in which said brace is disposed out of the path of swinging movement of said tension arm and a second position in which said brace is disposed within the path of swinging movement of said tension arm and is then operable to limit the swinging movement of that part of said tension arm which interconnects said frame and said central pivot point to thereby effect pivoting movement of said platform from the horizontal to vertical position in response to the swinging movement of said supporting means from its lower position to its upper position, and shifting means for moving said brace from said first to said second position.

2. The improved load lifting structure of claim 1 characterized further by the inclusion of manually operable and elongated lever means mounted on said frame for rotative and axial movement, and means responsive to rotative movement of said lever means for actuating said power means, said shifting means being operative to move said brace from said first to second positions in response to axial movement of said lever means.

3. The improved load lifting structure of claim 1 characterized further in that a first latch member is mounted on said frame and a second latch member is mounted on said supporting means positioned to engage said first latch member as said supporting means swings to its upper position.

4. The improved load lifting structure of claim 3 characterized further in that latch shifting means are mounted on said frame for moving said first latch member laterally out of engagement with said second latch member, thereby permitting downward swinging movement of said supporting means.

5. The improved load lifting structure of claim 2 characterized further in that a first latch member is mounted on said frame, a second latch member is mounted on said supporting means positioned to engage said first latch member as said supporting means swings to its upper position, and said first latch member is connected to said manually operable lever means for movement laterally out of engagement with said second latch member responsve to axial movement of said manually operable lever means.

6. The improved load lifting structure of claim 5 characterized further by the inclusion of spring biasing means axially urging said manually operable lever means to a latching position where said first and second latch members are in engagement and said brace is in said first position, and said brace and first latch member are so positioned with respect to said lever means that movement of said lever means from said latching position against said spring biasing means first disengages said first and second latch members and then moves said brace into said second position.

References Cited in the file of this patent

UNITED STATES PATENTS

| | | |
|---|---|---|
| 2,576,881 | Kern | Nov. 27, 1951 |
| 2,768,758 | French | Oct. 30, 1956 |
| 2,822,938 | Ormsby | Feb. 11, 1958 |
| 2,899,089 | Ajero | Aug. 11, 1959 |